Feb. 20, 1973 R. G. HAGLER 3,717,381

TRANSPORTING AND POSITIONING SYSTEM

Filed July 25, 1969

INVENTOR
ROBERT GIBSON HAGLER

ATTORNEY

United States Patent Office 3,717,381

Patented Feb. 20, 1973

3,717,381

TRANSPORTING AND POSITIONING SYSTEM

Robert G. Hagler, Richardson, Tex., assignor to Texas Instruments Incorporated, Dallas, Tex.

Filed July 25, 1969, Ser. No. 844,918
Int. Cl. B65g *51/02*
U.S. Cl. 302—31 11 Claims

ABSTRACT OF THE DISCLOSURE

A transporting and positioning system for integrated circuit slices and the like includes a line of slice supporting and positioning holes, slice braking holes positioned adjacent the line and slice locating holes positioned adjacent the braking holes in the direction of slice motion. Slices are propelled through the system by directing compressed air through the supporting and transporting holes. Individual slices are stopped by generating a slice attracting vacuum in the braking holes. After a slice is stopped it is precisely located by releasing the vacuum in the braking holes and generating a vacuum in the locating holes.

BACKGROUND OF THE INVENTION

In the manufacture of integrated circuits and other electronic components, individual circuits are typically fabricated by forming relatively large slices or wafers each containing a large number of individual circuits. Heretofore such slices have commonly been formed by manufacturing process including batch processing operations. In such operations, large numbers of slices are loaded into containers for processing as a group.

This invention relates to the transporting and positioning of integrated circuit slices and similar workpieces in a continuous flow slice processing system. In such a system, each process step is applied to each slice on an individual basis. In accordance with the invention, slices are transported through a processing system by jets of compressed air. The slices are stopped and positioned at various points in the system by applying braking and locating vacuums to the slices.

SUMMARY OF THE INVENTION

In the preferred embodiment, this invention comprises a transporting and positioning system including workpiece supporting jets and at least one workpiece braking vacuum. Preferably, a workpiece locator is positioned adjacent the braking vacuum in the direction of workpiece motion.

DESCRIPTION OF THE DRAWING

A more complete understanding of the invention may be had by referring to the following detailed description when taken in conjunction with the drawing, wherein.

DETAILED DESCRIPTION

Figure 3:
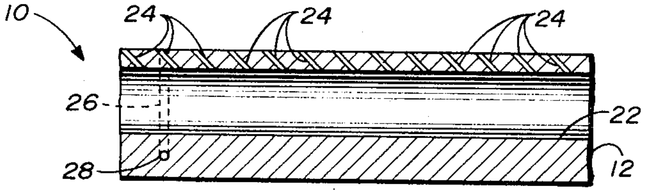
FIG. 3 is a sectional view taken generally along the line 3—3 of FIG. 2 in the direction of the arrows.

Referring now to the drawing, a transporting and positioning system 10 employing the invention is shown. The system 10 comprises a representative portion of a much larger transporting and positioning system intended for use with a continuous flow integrated circuit slice processing system or the like. The transporting and positioning system operates to move slices through the processing system and to precisely locate the slices at various points in the processing system.

Figure 2:
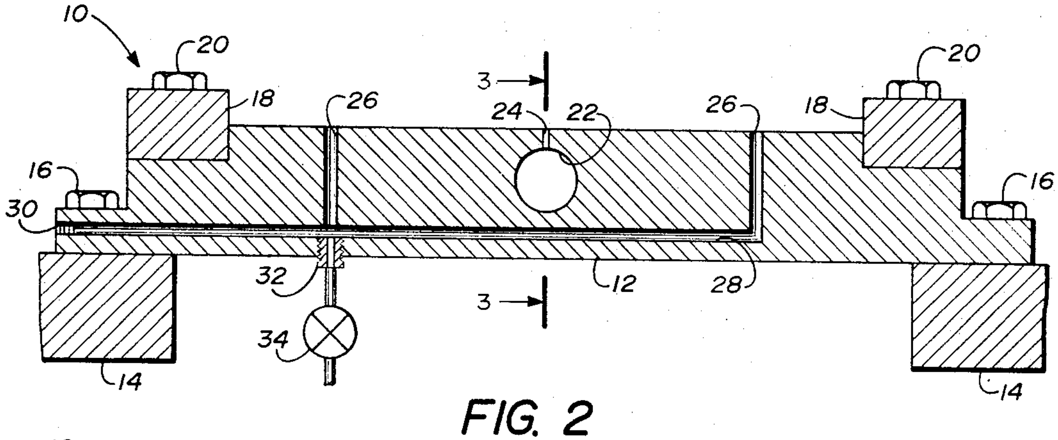
FIG. 2 is a sectional view taken generally along the lines 2—2 in FIG. 1 in the direction of the arrows.

Referring now to FIG. 2, the transporting and positioning system 10 includes an elongate bottom plate or floor 12 which is secured to a pair of frame members 14 by a plurality of bolts 16. The floor 12 in turn supports a pair of guide members 18. The guide members 18 extend along opposite sides of the floor 12 and are secured to the floor by a plurality of bolts 20.

As is most clearly shown, in FIG. 3 a circular plenum cavity 22 extends longitudinally through the floor 12. A plurality of slice supporting and transporting holes 24 extend angularly through the floor 12 from the cavity 22 to the upper surface of the floor. In use, a pressurized fluid, such as compressed air, is continuously directed into the plenum cavity 22. The compressed air flows through the holes 24 to form slice supporting and transporting jets above the floor 12. The jets support integrated circuit slices and similar workpieces above the upper surface of the floor 12 on a cushion of air. The jets also propel the slices along the floor 12 in a direction corresponding to the direction of inclination of the holes 24, that is leftwardly in FIG. 3.

Figure 1:
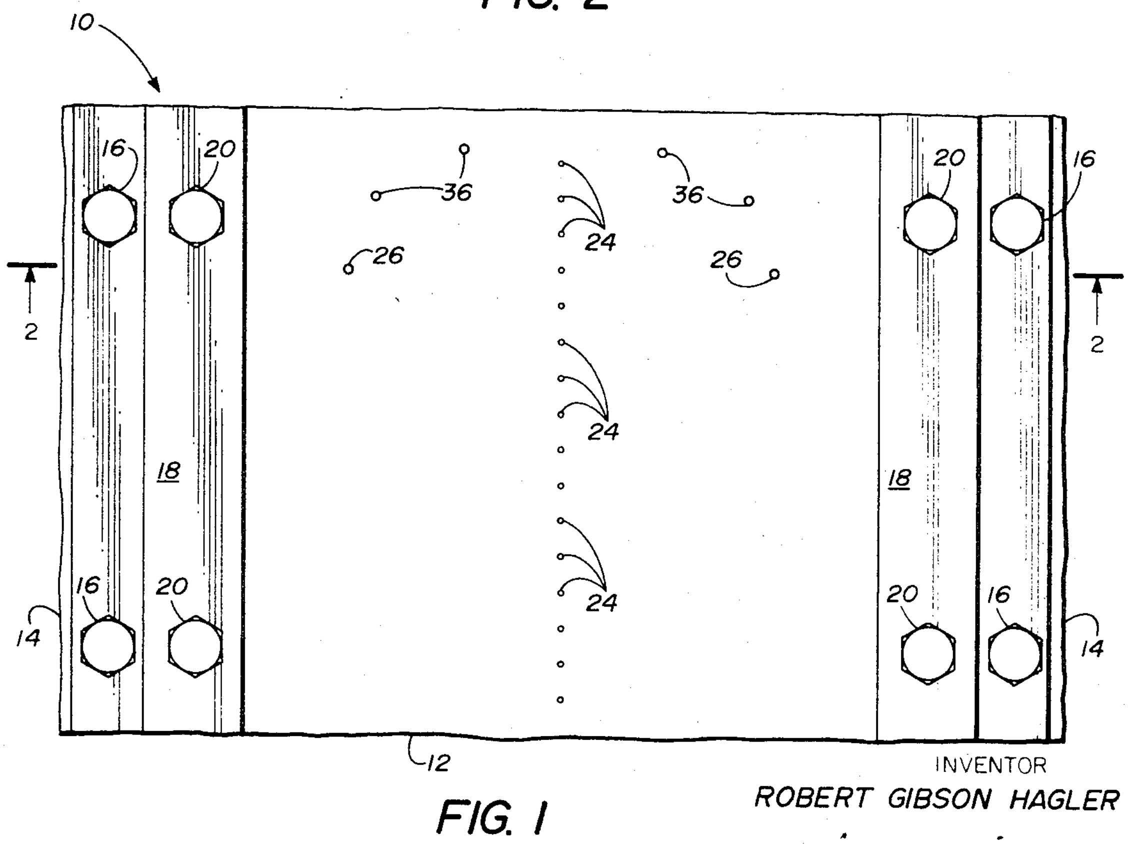
FIG. 1 is a top view of a portion of a transporting and positioning system employing the invention.

As most clearly shown in FIGS. 1 and 2, the floor 12 also has a pair of slice braking holes 26 formed in it. The holes 26 are connected to a passageway 28 which extends laterally through the floor 12 and which is plugged by a set screw 30. A fitting 32 is mounted on the bottom of the floor 12 and serves to connect the passageway 28 to the vacuum source (not shown) through a valve 34.

In the operation of the transporting and positioning system 10, the valve 34 is actuated to connect the braking holes 26 to the vacuum source whenever a slice is to be stopped at a point on the floor 12 corresponding to the positioning of the holes 26. Whenever a slice is present over the holes 26, the vacuum in the holes draws the slices into frictional engagement with the upper surface of the floor 12 against the action of the compressed air jets formed by the holes 24. Frictional engagement with the slice with the floor 12 prevents further movement of the slice along the floor 12 under the action under the jets.

Due to variations in the weight and speed of slices transported by the system 10, the braking holes 26 cannot be relied upon to stop all slices at precisely the same point. To this end, the system 10 is provided with a plurality of slice locating holes 36. As is shown in FIG. 1, the holes 36 are formed through the floor 12 at points adjacent the holes 26 in the direction of slice movement along the floor 12. Although the holes 36 may be arranged in any convenient manner, they are preferably formed in a semi-circular array which closely parallels the outer periphery of slices transported in the system 10. The holes 36 are constructed similarly to the holes 26 and are connected through a valve (not shown) to a vacuum source (also not shown).

The locating holes 36 are operated to precisely position a slice that has been stopped by the operation of the braking holes 26. As a slice travel along the floor 12, a vacuum is first generated in the holes 26 to draw the slice into frictional engagement with the floor 12, whereupon the motion of the slice is arrested. This positions the slice very close to but not precisely on a nominal location on the floor 12.

After the slice has come to rest, the vacuum in the holes 26 is released and a vacuum is generated in the holes 36. Since compressed air is continually forced through the chamber 28 to form slice supporting and transporting jets, the slice immediately begins to move away from the holes 26 toward the holes 36.

As soon as the slice comes into alignment with the holes 36, it is drawn into frictional engagement with the floor 12, whereupon its forward motion is again stopped. Due to the relatively short distance between the holes 26 and the holes 36, the slice gains very little inertia during its travel between the holes 26 and the holes 36. Therefore, the holes 36 position the slice very precisely relative to the floor 12.

It should be understood that the transporting and positioning system shown in the drawing is illustrated by way of example only and that many other arrangements are possible. For example, retractable pins or other mechanical stops can be used in place of the holes to precisely position slices that have been previously stopped by the braking holes 26. Conversely, various devices other than a vacuum brake can be employed to initially slow or stop slices prior to precise positioning by the locating holes 36. Regardless of the arrangement employed, the transporting and positioning system according to the present invention operates to transport integrated circuit slices and similar workpieces over a course in a rapid yet gentle manner and to precisely locate such workpieces at predetermined locations along the course.

Although only one embodiment of the invention is illustrated in the drawing and described herein, it will be understood that the invention is not limited to the embodiment disclosed but is capable of rearrangement, modification and substitution of parts and elements without departing from the spirit of the invention.

What is claimed is:

1. In an electronic component manufacturing system, a slice transporting and positioning system comprising:
- a guideway including an elongated floor and guide members positioned on opposite sides of the floor;
- means positioned along a line extending the length of the floor for directing a plurality of slice supporting and propelling jets through the floor, and
- means for selectively drawing slices into frictional engagement with a predetermined portion of the floor by overcoming the supporting and propelling action of the jets.

2. The slice transporting and positioning system according to claim 1 wherein the means for drawing slices into engagement with the floor includes a pair of holes formed in the floor on opposite sides of the line and means for selectively generating a vacuum in the holes.

3. In an electronic component manufacturing system, a slice transporting and positioning system comprising:
- (a) a guideway including an elongated floor and guide members positioned on opposite sides of the floor, said guideway having a pair of holes formed in said floor on opposite sides of a line of holes extending the length of said floor for directing a plurality of slice supporting and transporting jets through said floor;
- (b) means for selectively generating a vacuum in said pair of holes;
- (c) a slice locating hole formed in said floor at a point adjacent said pair of holes in the direction of slice movement; and
- (d) means for generating a vacuum in said locating hole upon release of the vacuum in said pair of holes.

4. A workpiece transporting and positioning system comprising:
- (a) means extending along a predetermined course for generating a plurality of workpiece supporting and propelling jets;
- (b) means for generating a workpiece stopping vacuum overcoming the supporting and propelling action of said jets at a predetermined point on the course;
- (c) means positioned on the course adjacent the vacuum generating means for locating workpieces that have been stopped by said vacuum; and
- (d) means for deactivating said stopping vacuum generating means when activating said workpiece locating means.

5. The system according to claim 4 wherein said means for locating workpieces includes means for generating a workpiece locating vacuum at a point beyond the predetermined point in the direction of workpiece movement.

6. A workpiece transporting and positioning system comprising:
- (a) means extending along a predetermined course for generating a plurality of workpiece supporting and propelling jets
- (b) means for selectively generating a reduced-pressure suction to overcome the supporting and propelling action of said jets at a predetermined point on the course to stop workpieces moving along said course; and
- (c) means positioned on the course at a point beyond the predetermined point in the direction of workpiece movement for locating workpieces that have been stopped by said reduced-pressure suction generating means upon deactivation of said reduced-pressure suction.

7. A workpiece transporting and positioning system comprising:
- (a) a guideway having jet forming holes formed therein extending angularly with respect to said guideway such that the jets move workpieces along said guideway, and having at least one reduced-pressure suction hole formed therein;
- (b) means for directing a fluid through the jet forming holes thereby generating a plurality of workpiece supporting and propelling jets;
- (c) means for selectively generating a reduced-pressure suction in said additional hole for arresting workpiece motion relative to said guideway by drawing workpieces into frictional engagement with said guideway and thereby producing a workpiece braking force; and
- (d) means for precisely locating workpieces upon release of the reduced-pressure suction in said one additional hole.

8. The system according to claim 7 wherein the means for precisely locating workpieces includes at least one additional hole formed in the guideway and means for selectively generating a reduced-pressure suction in said additional hole upon release of the reduced-pressure suction in said reduced-pressure suction hole.

9. A workpiece transporting and positioning system comprising:
- (a) jet means extending along a predetermined course for supporting and propelling said workpiece;
- (b) first vacuum means for stopping said workpiece by overcoming the supporting and propelling action of said jet means at a predetermined point on the course;
- (c) second vacuum means positioned on the course adjacent said first vacuum means for locating workpieces that have been stopped by said first vacuum means; and
- (d) means for deactivating said first vacuum means when activating said second vacuum means.

10. A workpiece transporting and positioning system comprising:
- (a) means extending along a predetermined course for generating a plurality of workpiece supporting and propelling jets to move workpieces along said predetermined course;
- (b) means for selectively generating a reduced-pressure suction at a predetermined point on the caurse to overcome the supporting and propelling action of said jets and to stop workpieces moving along said course;
- (c) means positioned on the course at a point beyond the predetermined point in the direction of workpiece movement for locating workpieces that have been stopped by said reduced-pressure suction generating means; and
- (d) means for deactivating said means for generating a reduced-pressure suction at said predetermined point on the course whereby said workpiece is located by said workpiece locating means.

11. A workpiece transporting and positioning system comprising:

(a) means extending along a predetermined course for generating a plurality of workpiece supporting and propelling jets;

(b) means for selectively generating a reduced-pressure suction at a predetermined point on the course to reduce the speed of workpieces moving along said course; and (c) means for precisely locating workpieces that have been slowed down by said reduced-pressure suction generating means comprising a second reduced-pressure suction generating means positioned on the course at a point beyond the predetermined point in the direction of workpiece movement, said second means adapted to hold said workpiece against the propelling and supporting action of said jets.

References Cited

UNITED STATES PATENTS

| | | | |
|---|---|---|---|
| 2,539,972 | 1/1951 | Magnani | 302—29 |
| 2,778,691 | 1/1957 | Hazel | 302—31 |
| 2,975,894 | 3/1961 | Hill et al. | 209—81 |
| 3,190,460 | 6/1965 | Rubin | 302—2 |
| 3,395,943 | 8/1968 | Wilde et al. | 302—31 |
| 3,588,176 | 6/1971 | Byrne | 302—29 X |
| 3,645,581 | 2/1972 | Lasch et al. | 302—2 R |

EVON C. BLUNK, Primary Examiner

W. S. CARSON, Assistant Examiner